Patented Dec. 6, 1927.

1,651,931

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES CO., OF AKRON, OHIO, A CORPORATION OF OHIO.

RUBBER-VULCANIZATION ACCELERATOR.

No Drawing.   Application filed February 17, 1925. Serial No. 9,799.

My present invention relates to the art of vulcanizing rubber, and particularly to the process of accelerating the vulcanization of the rubber by employing a mixture of certain accelerators as hereinafter set forth, whereby a vulcanized rubber product of high quality and possessing desirable commercial characteristics is obtained.

In my Patent 1,467,984, issued September 11, 1923, I have claimed as an accelerator of the rubber vulcanizing process, a compound produced by the interaction of two molecular proportions of an aromatic primary amine with three molecular proportions of an aldehyde. Such a compound, which I have termed the aldehyde derivative of a Schiff's base, may be reacted with an additional quantity of the same or a different aldehyde to produce a modified and further reaction or condensation product which I have termed the aldehyde reaction product of an aldehyde derivative of a Schiff's base. The compounds included in this last mentioned class are usually much harder and more resinous than are the simpler condensation products and possess valuable properties as rubber vulcanizing accelerators, as I have fully described and claimed in my co-pending application, Serial No. 627,327, filed March 24, 1923.

The various accelerating compounds falling within the definitions of these two classes of substances are all of and by themselves excellent accelerators of the rubber vulcanizing process. I have now further found that various mixtures of these different types of more or less closely related compounds may with advantage be used in rubber mixes to produce a vulcanized product which possesses peculiarly characteristic and valuable commercial qualities.

Although it is possible to use various proportions of these different types of compounds in the manufacture of a vulcanized rubber product, I have found that it is usually desirable to prepare a mixture in which not over 25%, and preferably approximately 23% of the aldehyde derivative of a Schiff's base is homogeneously admixed with not less than 75% and preferably with approximately 77% of the aldehyde reaction product of the aldehyde derivative of a Schiff's base.

According to the preferred method of preparing these various compounds, as fully described and set forth in my copending application Serial No. 627,326 filed March 24, 1923, an aldehyde, such as acetaldehyde is reacted with an aromatic primary amine, such as aniline, whereby three molecular proportions of the aldehyde are combined with two molecular proportions of the amine. The water of condensation may or may not be but preferably is removed by drying until not more than 2% water remains in the product which may then be reacted upon with an additional quantity of the same aldehyde or with another aldehyde, such as formaldehyde, if desired. This second reaction product may then be dehydrated until not more than 2% water remains in the material. The preparation of the second product by the further action of an aldehyde upon the first named product is fully described and claimed in my co-pending application, Serial No. 627,325 filed March 24, 1923.

The mixture of accelerators whose use I disclose and claim in my present invention may be readily prepared by taking approximately 77 parts of the second dehydrated product mentioned above and carefully melting with it while stirring vigorously so to avoid overheating, approximately 23 parts of the first mentioned dehydrated product. It is, of course, possible to mix these materials by adding the desired proportions of the necessary ingredients while either or both of the materials are in the molten condition, that is, upon the completion of the respective dehydrating steps in the preparation of the materials as mentioned. Upon cooling of the mixture, the product may be readily ground and sifted to the desired degree of fineness.

The product, when prepared in the manner as described, may be incorporated into a number of different types of rubber mixes, depending upon the character of the final vulcanized product desired. Although the preparation of such rubber compounds is readily apparent to those skilled in the art, the following formula is given as one in which the very desirable properties of the above mentioned mixture of accelerators is readily apparent. One hundred parts of rubber of the grade known to the trade as smoked sheets, 3.5 parts of sulfur, 5 parts of zinc oxide and 1 part of accelerator are mixed on the differential rubber mills in the well known manner. As an accelerator I preferably employ one comprising approximately 77% of the aldehyde reaction product of the aldehyde derivative of a Schiff's base homogeneously admixed with approximately 23% of the aldehyde derivative of a Schiff's base. The rubber mix is then vulcanized in a press under a pressure of approximately 40 pounds of steam per square inch for a period of about 30 minutes. It is found upon testing the vulcanized product that the modulus at 300% elongation is 347, at 500% is 626, at 700% is 2425; the tensile strength at break is 3565 pounds per square inch and the elongation at break is about 770%. These values are indicative of the valuable properties of a vulcanized rubber product produced by employing my mixture of accelerators and are characteristic of the entire class of compounds.

As an example of the type of a Schiff's base which I may employ in the preparation of the compounds mentioned, I prefer to use one prepared by the reaction of acetaldehyde upon aniline whereby ethylidene aniline is produced. This compound is then reacted with a further quantity of acetaldehyde to produce the acetaldehyde derivative of ethylidene aniline which is preferably dehydrated to a moisture content of approximately 2%. This compound is comparatively soft at temperatures as low as 30 to 40° C. and in order to be used advantageously and most readily in a rubber mix, is best compounded by the process known as master batching.

This additional compounding step, however, is not necessary and may be avoided if the softer material be mixed, as shown, with a harder product and as such a product I prefer to use the formaldehyde or acetaldehyde or further aldehyde reaction product of the softer material just mentioned which reaction product melts at about 80° C. My process broadly then, includes the preparation of a rubber product by employing as an accelerator a mixture of compounds, one of which possesses a lower melting point than the other. By this method, the master batching of the lower melting accelerator is avoided.

This method of preparing and using a mixture of two vulcanization accelerators as hereinbefore disclosed is also a very desirable means of advantageously employing an accelerator of fast curing properties. Such an accelerator, unless skillfully compounded in the rubber mix, and the mix carefully vulcanized, under some conditions may produce or cause some undesirable effect in the rubber, such as scorching, overcuring and the like. It is, of course, possible to vulcanize rubber mixes containing such accelerators at lower steam pressures than 40 pounds to the square inch and thereby avoid the danger of harmful results but this is a subterfuge to be avoided, if possible.

Particularly referring to the type of accelerators hereinbefore mentioned, I have found, as is pointed out in one of my other applications before mentioned, that the addition of formaldehyde to the aldehyde derivative of a Schiff's base may produce a progressive change in the properties of the product as the quantity of aldehyde employed is increased. In general, the more formaldehyde that is added to the acetaldehyde derivative of ethylidene aniline and analogous compounds, the lower will be the curing power of the product formed and the higher will be the physical properties produced in the rubber compound when cured at 40 pounds of steam pressure to the square inch. By employing the mixture of accelerators mentioned I accomplish several objects. Thus, I may take advantage of the high curing power of the one accelerator without undue danger of scorching the rubber product and increase the tensile strength of the product by employing the desirable properties of a second accelerator. It is possible and entirely probable that a rearrangement of certain of the reactive groups in the respective compounds may take place at the temperature and under the conditions imposed when mixing of the accelerators takes place but of this it is only possible to theorize, inasmuch as the compounds themselves are highly resinous materials of more or less unknown and as yet undetermined chemical constitution and configuration.

It is to be understood that the accelerators used in my process are not limited solely to those produced by means of the compounds mentioned in the example given. In place of aniline, I may employ any aromatic primary amine, such as the xylidenes, the toludines and the like and in place of the acetaldehyde and formaldehyde mentioned, I may use other aliphatic aldehydes such as propionaldehyde, butylaldehyde and the like or unsaturated aldehydes such as crotonaldehyde, acrolein, etc. It is also understood that the examples I have given are explanatory and not limitative of my invention which I intend to claim as broadly as the prior art permits.

What I claim is:

1. The process of producing vulcanized rubber which comprises heating rubber and sulfur in the presence of a mixture of accelerators, said mixture comprising the aldehyde derivative of a Schiff's base and the aldehyde reaction product of the aldehyde derivative of a Schiff's base.

2. The process of producing vulcanized rubber which comprises heating rubber and sulfur in the presence of a mixture of accelerators, said mixture comprising the aldehyde derivative of dehydrated ethylidene aniline and the aldehyde reaction product of the aldehyde derivative of dehydrated ethylidene aniline.

3. The process of producing vulcanized rubber which comprises heating rubber and sulfur in the presence of a mixture of accelerators, said mixture comprising 23% of the aldehyde derivative of dehydrated ethylidene aniline and 77% of the aldehyde reaction product of the aldehyde derivative of dehydrated ethylidene aniline.

4. A rubber product comprising the vulcanization product of rubber, sulfur and a mixture of accelerators comprising the aldehyde derivative of dehydrated ethylidene aniline and the aldehyde reaction product of the aldehyde derivative of dehydrated ethylidene aniline.

5. A rubber product comprising the vulcanization product of rubber, sulfur and a mixture of accelerators comprising 23% of the aldehyde derivative of dehydrated ethylidene aniline and 77% of the aldehyde reaction product of the aldehyde derivative of dehydrated ethylidene aniline.

6. A rubber product comprising the vulcanization product of rubber, sulfur and a mixture of accelerators comprising the aldehyde derivative of a Schiff's base and the aldehyde reaction product of the aldehyde derivative of a Schiff's base.

7. The process of producing vulcanized rubber which comprises heating rubber and sulphur in the presence of a mixture of accelerators, said mixture comprising one part of the reaction product of three molecular proportions of an aliphatic aldehyde with two molecular proportions of an aromatic primary amine admixed with approximately three parts of the product resulting from the treatment with an aliphatic aldehyde of the reaction product of three molecular proportions of an aliphatic aldehyde with two molecular proportions of a primary aromatic amine.

8. The process of producing vulcanized rubber which comprises heating rubber and sulphur in the presence of a mixture of accelerators, said mixture comprising approximately 23% of the reaction product of three molecular proportions of an acetaldehyde with two molecular proportions of aniline admixed with approximately 77% of the product resulting from the treatment with formaldehyde of the reaction product of three molecular proportions of acetaldehyde with two molecular proportions of aniline.

In testimony whereof I affix my signature.

CLAYTON OLIN NORTH.